FREE ACCESS CONTROL

Filed March 21, 1960 3 Sheets-Sheet 1

*INVENTORS*
STEPHEN BESPALKO
JAMES R. EVANS
RAYMOND J. KLOTZ
BY William N. Barret
ATTORNEY Nov. 23, 1965 S. BESPALKO ETAL 3,219,979

FREE ACCESS CONTROL

Filed March 21, 1960 3 Sheets-Sheet 2

United States Patent Office 3,219,979

Patented Nov. 23, 1965

3,219,979
FREE ACCESS CONTROL

Stephen Bespalko, Vestal, James R. Evans, Endwell, and Raymond J. Klotz, Endicott, N.Y., assignors to International Business Machines Corporation, New York, N.Y., a corporation of New York Filed Mar. 21, 1960, Ser. No. 16,434
6 Claims. (Cl. 340—172.5)

Figure 1:
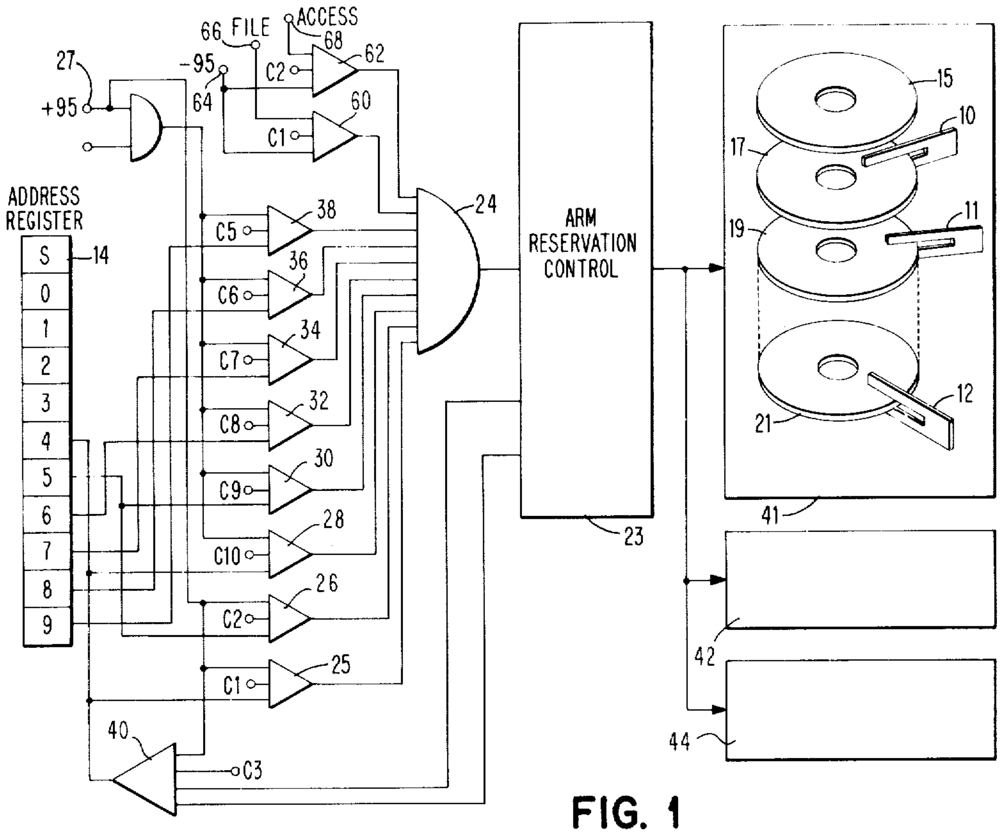

The present invention relates to an access control for an input-output facility. In particular, the present invention relates to a control associated with an input-output facility connected to a data processing system wherein information may be transferred between the system and a storage unit in the input-output facility by a preselected mechanism.

The data storage apparatus of the input-output facility in the particular case shown consists of a number of magnetizable discs mounted on a common shaft which is rotated at a high velocity. A plurality of arms or transfer mechanisms are positioned adjacent to these discs and are adapted to be moved both vertically and radially to select a particular disc and track on which to read or write. Further, the facility may consist of a number of units in which there are a plurality of discs having similar structure.

In previous machines which utilized an auxiliary storage facility, it was necessary to store the data concerning availability and reservation of the various transfer mechanisms in the main storage of the machine. The data processing machine itself was utilized to check on whether a transfer mechanism was available and to hold the same at its selected position until the proper instruction word was reached for transferring information. This is undesirable in that a great number of instruction words and machine operations are consumed in keeping a running account of the operation of the auxiliary storage units.

The present invention solves this problem by providing a separate arm reservation control which determines whether any given arm is being used. This control allows the status of the transfer mechanisms or arms in the auxiliary storage unit to be determined separate and apart from the data processing machine.

Further, in previous apparatus the instruction word would have to specify which transfer mechanism it was desired to use in the transfer of information. While the present invention may specify the use of a given arm, provision is made to indicate a free access by which the status of each successive arm is sensed until one is found which has not been engaged by a previous instruction word.

The present invention, therefore, relates to an apparatus which reduces the number of operations in a data processing machine and provides a greater flexibility in operation than prior apparatus.

It is therefore an object of this invention to provide an improved access control for an input-output facility.

It is a further object of the present invention to provide a transfer mechanism reservation control for a series of information transfer mechanisms connecting an input-output facility to a data processing machine in which a digit from an instruction word from said machine provides a reservation by the control.

Another object of the present invention is to provide a transfer mechanism reservation control for a series of information transfer mechanisms connecting an input-output facility to a data processing machine in which a predetermined digit from an instruction word from said machine provides a reservation of any available transfer mechanism.

The foregoing and other objects, features and advantages of the invention will be apparent from the following more particular description of a preferred embodiment of the invention, as illustrated in the accompanying drawings.

In the drawings:

FIG. 1 is a schematic illustration of the invention.

Figure 2A:
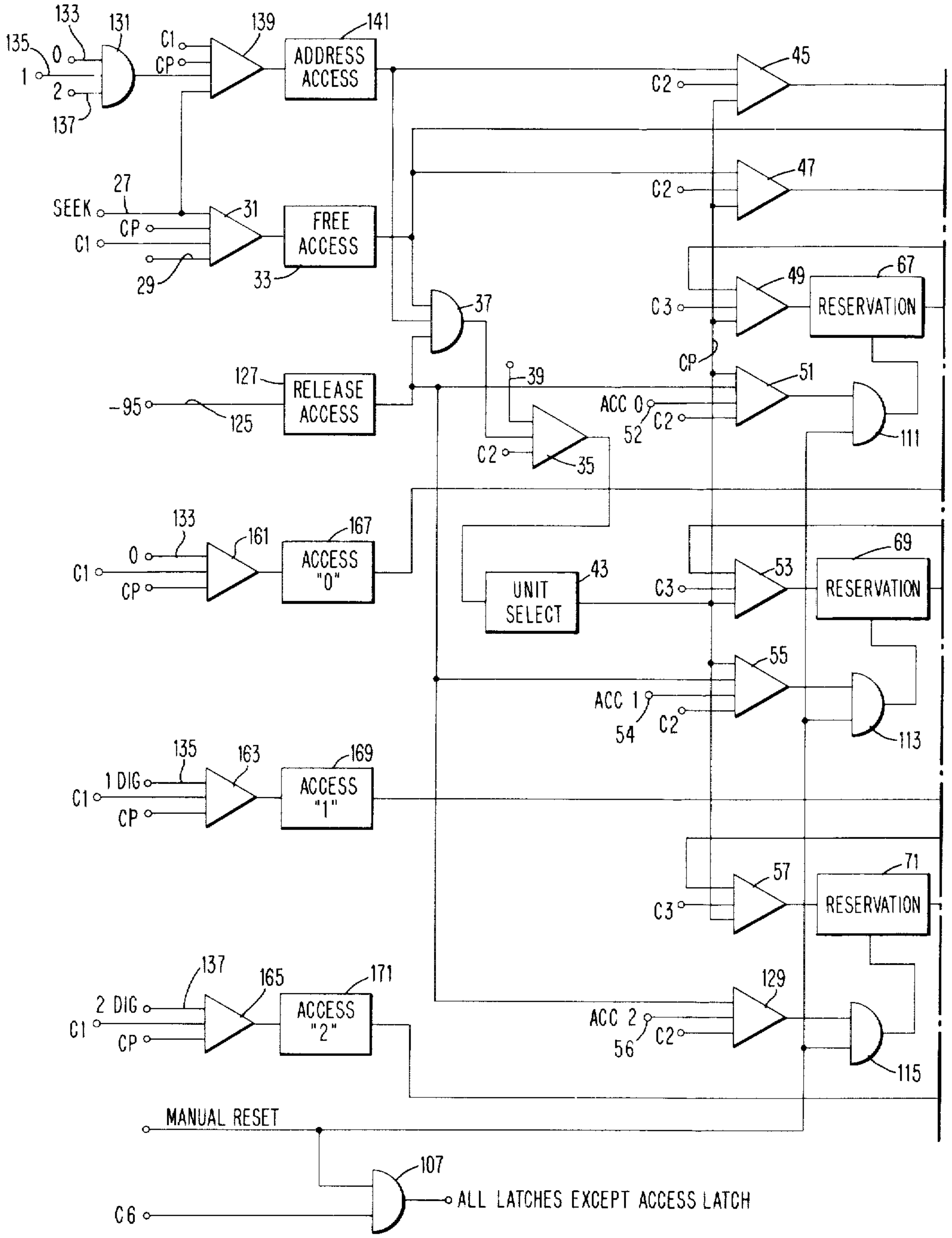
Figure 2B:
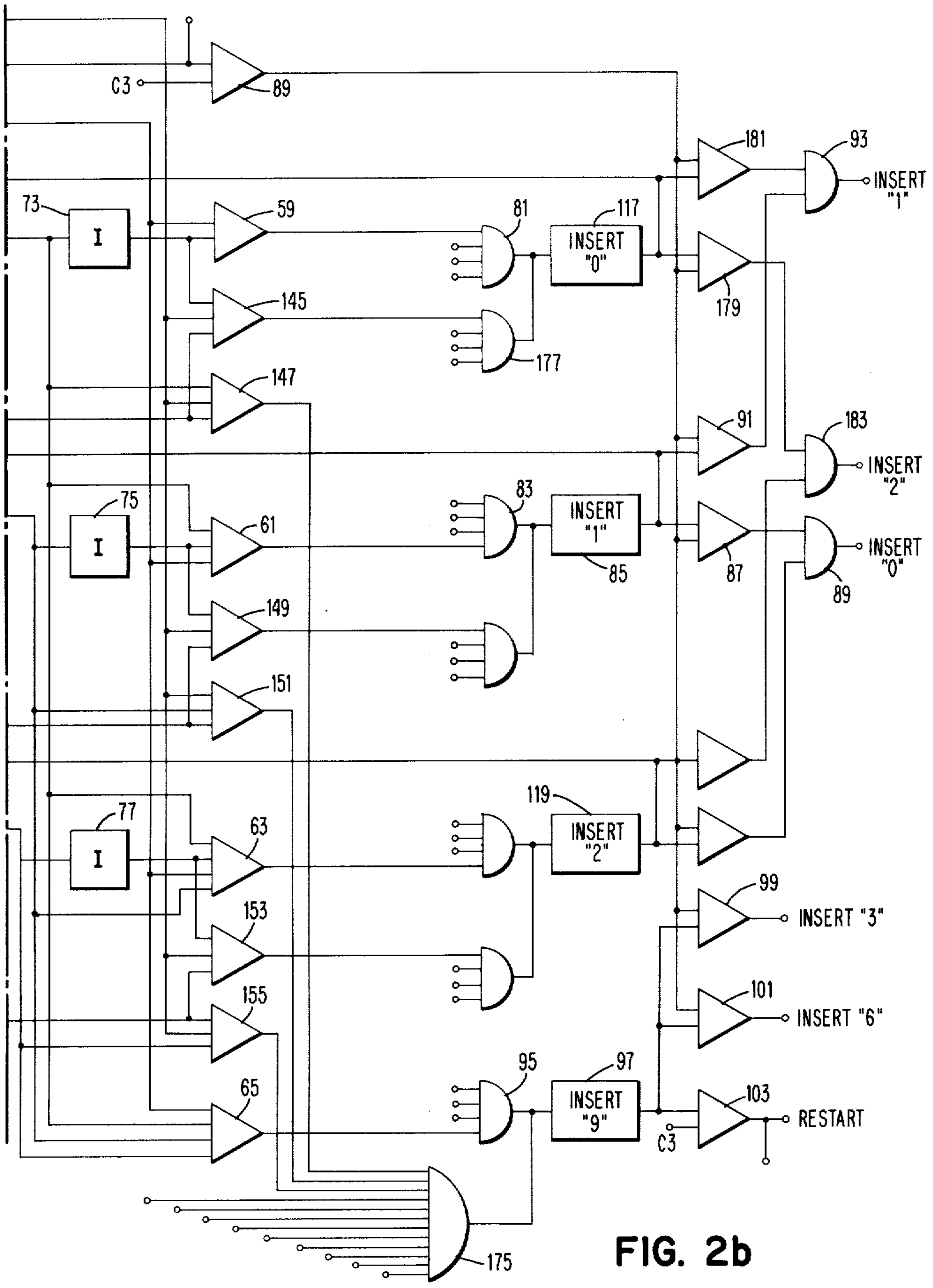

FIGS. 2*a* and 2*b* are a detailed circuit of the arm reservation control of FIG. 1.

Figure 3:
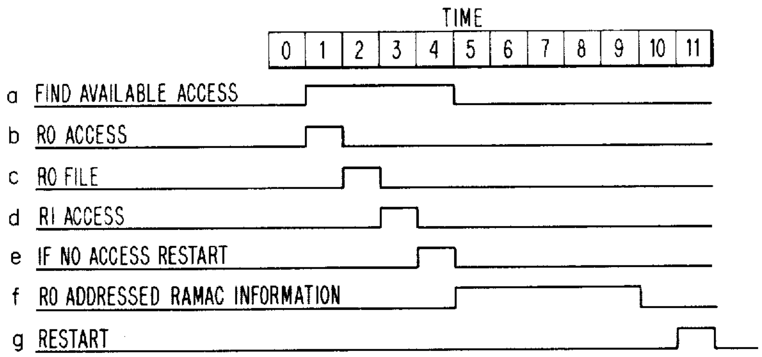

FIG. 3 is a timing pulse diagram.

The general operation of the apparatus will be described in relation to FIG. 1 which illustrates schematically the various functional units necessary to provide a reservation of a particular transfer mechanism 10, 11 or 12 in a particular input-output facility 41, 42 or 44. An address register 14 contains a number of storage positions shown as S and 0 through 9 which contain the following data:

Digits positions S, 0, 1, 2, and 3, are not used for an address operation.

Digit 4 is the access arm 10, 11, or 12 which is selected by inserting a number 0, 1, or 2. Any other digit contained in the digit 4 place will provide a free access or in other words, the first available arm.

Digit 5 selects a storage unit. In this instance we have shown only three storage units, 41, 42 and 44.

Digits 6 and 7 are used for the selection of a storage disc such as shown at 15, 17, 19, and 21, although it is realized that there will be many more.

Digits 8 and 9 designate the track of the disc to which an arm 10, 11 or 12 will be moved for a read or a record operation.

Upon an appropriate timing signal, the coded designations will be read out in proper order to the arm reservation control 23 which will, if the digit in place 4 is 0, 1, or 2 to select a particular arm, operate to pick a predetermined latch therein to indicate that an arm has been selected. Where a free access is coded in digit place 4 (any digit besides 0, 1 and 2), the first available arm which is available will be chosen and a signal sent back to the digit place 4 to indicate the number of the arm selected. In a subsequent timing pulse interval, the digit position 4 will again be read out to the particular unit which has been designated by address in register 14 to select the proper transfer mechanism 10, 11 or 12.

In the schematic illustration of FIG. 1, it should be understood that the lines illustrated are in actuality one or more depending on the code which is then being used. Translators may and will necessarily have to be used in various locations to go from a coded five line to a single line where necessary. Translators have not been shown in all instances since they consist in mere passive logic and are well known in the art which recognizes particular bit combinations to select a single line or in the opposite instance to take a single energized line and convert it to its coded representation. Timing signals are shown at various terminals to indicate pulses which are available at predetermined intervals of time. No apparatus has been shown generating these pulses since the pulse generators form no particular portion of the present invention and are well known in the art.

With a signal on line 27, designated as operation code 95 and as "find available access" FIG. 3, line *a*, shown in FIG. 3 pulse line *a*, a digit in stage 4 of the register 14 will at time C1, FIG. 3, line *b*, "read out access" be transferred through AND circuit 25 and through OR circuit 24 to arm reservation control 23. There are five bit positions each stage of register 14 so that each line represents five lines. The output of AND 25, which would also represent five AND circuits, would be five lines, connected to control 23 where they are translated to a single select line (not shown).

In FIG. 2*a*, the signal for free access, any digit other than 0, 1, or 2, appears on line 29 coupled to an AND circuit 31 which will signal 27, FIG. 3, line *a*, generates an output pulse at C1 time with a control pulse CP. The output of AND circuit 31 sets a free access inquiry latch 33. The latch is a bistable device and would be as shown in the patent to Hughes, Patent No. 2,628,309. With the latch set, raised voltage at its output will condition AND circuit 35 through OR circuit 37. A signal on line 39 represents the decoded output of digit place 5 which selects the particular unit 41, 42, or 44. The circuit of FIG. 2*a*, 2*b* represents the selection apparatus of unit 41 so that a signal on input 39 represents a selection of that unit. For other units, there would be identical apparatus to most of that shown in 2*a*, 2*b*. This would be read out of stage 5 of register 14 at C2 by AND 26. When all signals are present, AND circuit 35 will have a raised output and select a unit selection latch 43. The output of this latch will condition AND circuits 45–57.

The output of free access latch 33 will also enable AND circuit 47 at C2 time which will in turn condition AND circuits 59, 61, 63, and 65 for operation. The selection of a particular unit 41, 42, 44 is shown in FIG. 3, line *c*, and is "read out file."

To determine whether a particular arm 10, 11, or 12 is in use, a series of reservation latches 67, 69, and 71 are used. When set, the voltage of the output of the latch, at the right, will be up. If the arm 10 which is controlled by reservation latch 67 is in use, the output of 67 will be up and the output of inverter 73 will be down and the AND circuit 59 will not be enabled by the signal from AND circuit 47. The signal, however, from the output of 67 will be applied to the input of AND circuit 61 in the controls of reservation latch 69, as shown, and the output of inverter 75 connected to the output of latch 69 will test to see if the arm 11 has been previously selected. If the arm has been selected, the next arm or mechanism latch 71 will be tested to determine if the arm 12 is in use.

If it is determined, for example, that the arm 11 is not in use, the access latch 69 will be down and the output of inverter 75 will be up to condition the AND circuit 61 and furnish a signal to OR circuit 83 to set code latch 85. When the output of the code latches 85, 117, 119 are up, a signal will be transmitted to the AND circuits 49, 53, or 57, FIG. 2*a*, which at C3 time will set the particular latch to indicate the selected arm and prevent use thereof until the latch is reset. Latch 85 is termed an insert 1 latch which denotes that the number 1 should be inserted back into the control word which initiated the operation therein. The output of latch 85 is coupled to AND circuit 87 which is enabled by a signal from AND circuit 89 which has an output at C3 time, as shown to generate a zero bit which is the output of OR circuit 89. A similar operation takes place with AND circuit 91 wherein OR circuit 93 generates a 1 bit. The AND circuits 87 and 91 therefore effect a translation from a selected output, latch 85, to the coded bits which form the number in 2 out of 5 bit code representation. In this code, a zero is indicated by a 1 and a 2 bit, a 1 is indicated by 0 and a 1 bit, and a 2 is indicated by a 0 and a 2 bit.

The output of the OR circuits 93 and 89 and AND circuits 99 and 101 is to the AND circuit 40, FIG. 1. These outputs represent the coded bits which are to be reinserted into register 14 at time C3. Time C3, line *d*, FIG 3, is "read in access" which denotes that the reservation will be made at this time.

In the event that all arms are in use, the AND circuit 65 will be conditioned by the outputs of all of the reservation latches 67, 69, and 71 as well as by the output of AND circuit 47 to transmit a signal through an OR circuit 95 to set a code latch 97. Latch 97 conditions AND circuits 99 and 101. At time C3, the output of these AND circuits rise and a 3 bit and a 6 bit are inserted in register 14. These indicate that no transfer mechanism was available. The output of latch 97 also conditions an AND circuit 103. The output of the AND circuit restarts the machine and the next instruction is used. The pulse, FIG. 3, line *e*, is shown at C4 time, subsequent to the output of AND 103.

At C5 and C6 time, the information in positions 8 and 9 of the register 14 is gated by AND circuits 38 and 36 to pick up the track latches which designate a location on a particular disc 15, 17, 19, and 21. At time C6, a signal through OR circuit 107 will reset all latches with the exception of 67 through 71. At C7 and C8 time, positions 6 and 7 of the address register, are read out by AND circuits 32 and 34, FIG. 1, to pick up disc latches which indicate the desired storage disc 15, 17, 19 or 21. At C9 time, position 5 is read out by AND 30 to select the particular unit in which the arm and the disc and tracks are located. At C10 time the digit in position 4 is again read out of the register 14 to pick up the access latches in the control unit itself.

The reservation latches 67, 69, and 71 are reset through OR circuits 111, 113, and 115 respectively. A release instruction on the line 125, FIG. 2*a*, sets a release latch 127 which conditions AND circuits 51, 55, and 129. The unit selection latch, operated in a manner similar to the free access operation above, also conditions AND circuits 51, 55 and 129. A timing pulse C2 is also used as an input to each of these AND circuits. In FIG. 1, the release instruction operation code -95, input 64 is connected to two AND circuits 60 and 62. At a time C1, the operation signal is gated by AND circuit 60 and appears as input 125, FIG. 2*a*. At time C2, a selected line 52, 54 or 56 is energized to raise the output of AND 51, 55, or 129 to reset the related reservation latch.

When the programmer desires to reselect a particular arm or mechanism which he has been using and over which he may still have control, the digit in position 4 will be 0, 1, or 2. If one of these digits is present, input 133, 135, or 137, FIG. 2*a*, it will be coupled through the OR circuit FIG. 2*a*, to and AND circuit 139. This circuit is enabled at C1 time to set the address access latch 141. The output of latch 141 is connected through OR circuit 37 to AND circuit 35 to set the unit selection latch 43 to condition the AND circuits 45 through 57. At C2 time, the output of AND circuit 45 will be up to condition the AND circuits 145, 147, 149, 151, 153, and 155. At the same time there will be an input on line 133, 135, or 137 to AND circuits 161, 163, or 165 respectively. AND circuit 161 senses the selection of the arm 10, 163 determines the selection of arm 11, and 165 determines the selection of the arm 12. The other inputs to the AND circuits just enumerated are the timing pulses C1 and the control pulse CP. Each one of these AND circuits when all inputs are present operates to set a particular inquiry latch 167, 169, and 171. With an access latch 167 set, for example, the AND circuit 147 will be conditioned if the reservation latch 67 has not been operated and the AND circuit 45 is up. If the access latch 67 is operated, AND circuit 147 will provide a signal through the OR circuit 175 to the insert 9 latch. The output of latch 97 is utilized with AND circuit 103 to generate a restart signal. However, the AND circuits 99 and 101 are not operated since the second input thereto is not up. This input is from AND circuit 89 which was conditioned by free access latch 33 which has not been operated.

If the arm is available, the latch will be picked to reserve the same and no further action is necessary by the reservation control.

As it will be seen with reference to this particular apparatus, the arm reservation system is shown only for the unit 0. Each further unit consists in the same circutry except for the translator as shown in FIG. 2*b*. The extra terminals connected to the OR circuits 81, 177, 175, etc., are merely indicative of the outputs from the other unit of storage and thus will not be described.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an input-output facility for a data processing system wherein data is to be exchanged between the system and said facility by one of a plurality of transfer mechanisms, the combination comprising a register for storing instruction data respecting the selection of said input-output facility and one of said transfer mechanisms, a mechanism reservation control for recording the use of said mechanisms, means responsive to the presence of an indication in said storage register denoting free access for scanning said reservation control to determine if there is a mechanism available for use, and means in said reservation control responsive to the detection of an available mechanism for transferring a digit to said storage register indicative of the mechanism available.

2. The apparatus of claim 1 further including means in said reservation control responsive to the absence of an available mechanism for generating a signal indicative that the instruction in said storage register cannot be completed.

3. The apparatus of claim 1 further including means responsive to the presence of an indication in said storage register denoting that a particular mechanism is to be used for testing said reservation control to determine whether the same has been selected, and means responsive to the prior selection of said mechanism for generating a signal indicative that the instruction in said storage register cannot be completed.

4. In an input-output facility for a data processing system wherein data is to be exchanged between the system and said facility by one of a plurality of transfer mechanisms, the combination comprising an address register for storing data respecting the selection of said input-output facility, a plurality of digit positions in said register in one of which is contained a digit respecting the mechanism to be used for transferring data, means for reading successive digits of said register, a reservation control, reservation means contained in said control to record the use of a mechanism, a series of inquiry latches in said reservation control each operable in response to a predetermined digit read from said storage register respecting said mechanism, means responsive to the operation of an inquiry latch denoting a free access for sensing successive reservation means, code means including means for generated a signal operated by the sensing of an unoperated reservation means, and means responsive to the operation of said code means for transferring an indication of the selected reservation means to said address register.

5. The apparatus of claim 4 further including means in said reservation control responsive to the absence of an available mechanism for generating a signal indicative that the instruction in said address register cannot be completed.

6. The apparatus of claim 4 wherein said sensing means includes a condition sensing circuit for each reservation means, means connecting the inverted output of the associated reservation means to each said sensing circuit, means for coupling a free access signal to all sensing circuits and means for connecting the output of all preceding reservation means to each sensing circuit whereby each successive sensing circuit will be responsive to all raised inputs to generate a signal to said code means.

References Cited by the Examiner

UNITED STATES PATENTS

| | | | |
|---|---|---|---|
| 1,895,113 | 1/1933 | Vernam | 340—152 |
| 1,927,556 | 9/1933 | Nelson | 340—147 |
| 2,132,684 | 10/1938 | Gardner | 340—152 |
| 2,919,431 | 12/1959 | Blackford | 340—172.5 |
| 2,952,731 | 9/1960 | Wright et al. | 340—172.5 |
| 2,952,732 | 9/1960 | Wright et al. | 340—172.5 |
| 2,982,946 | 5/1961 | Shugart | 340—172.5 |
| 2,984,827 | 5/1961 | Trapnell et al. | 340—172.5 |
| 3,014,654 | 12/1961 | Wieser et al. | 340—172.5 |
| 3,040,299 | 6/1962 | Crosby et al. | 340—172.5 |
| 3,045,217 | 7/1962 | Housman et al. | 340—172.5 |
| 3,082,406 | 3/1963 | Stevens | 340—172.5 |

MALCOLM A. MORRISON, *Primary Examiner.*

IRVING L. SRAGOW, *Examiner.*